3,183,374

SCALE-OF-FIVE CIRCUITS

Edmund Harry Cooke-Yarborough, Longworth, Abingdon, England, assignor to United Kingdom Atomic Energy Authority, London, England Filed Dec. 3, 1962, Ser. No. 241,991
Claims priority, application Great Britain, Dec. 5, 1961, 43,605/61
4 Claims. (Cl. 307—88.5)

This invention relates to scaling circuits.

Virtually all decimal scaling circuits consist of a conventional binary scaler combined with some sort of scale-of-five circuit. The scale-of-five circuit usually consists either of a combination of three binary circuits or a five-element scaling ring. With the three-binary circuits there are problems of gating and sequencing to suppress three of the eight possible states. The circuits for doing this either add considerably to the complication or worsen the tolerances of the circuit. The ring-of-five circuit tends to require many components and tolerances may be rather poor. Oscillation may be possible in the type in which sequencing is achieved by A.C. coupling round the ring, while the type using D.C. sequencing usually requires a sixth valve or transistor.

According to the present invention a scale-of-five circuit comprises a three-state stage having three electronic switching devices D.C.-interconnected such that in each stable state two of the devices are in one state of conduction and the third in the other state of conduction, A.C. connections from a first pair of the three devices to a second pair of said three devices thereof respectively for sequencing said other state in response to input pulses applied simultaneously to the three devices, and an A.C. connection from the remaining device via a binary stage to each of the other two devices for sequencing said other state from said remaining device alternately to each of the other two devices.

According to the present invention a scale-of-five circuit also comprises a three-state stage having first, second and third transistors and symmetrical D.C. couplings from each transistor to the other two such that in each stable state two transistors are on and one off, a common input pulse connection for turning on all three transistors, A.C. couplings between the first and second and between the third and first transistors for turning off the second or first transistor when the first or third transistor respectively turns on, a binary stage having fourth and fifth transistors symmetrically D.C. and A.C. coupled, an A.C. coupling from the second transistor to switch the binary stage each time the second transistor turns on, and A.C. couplings from the fourth and fifth transistors to the first and third transistors respectively to turn off the first or third transitsor each time the fourth or fifth transistor respectively turns on.

A scale-of-ten circuit according to the present invention comprises a scale-of-five circuit as aforesaid preceded by a further binary stage.

To enable the nature of the present invention to be more readily understood, attention is directed, by way of example, to the accompanying drawings wherein:

FIG. 2(*a*) shows collector waveforms with the arrangement of FIG. 2.

FIG. 3(*a*) shows collector waveforms with the arrangement of FIG. 3.

The present scale-of-five circuit comprises a binary stage and a three-state stage, giving a total of six possible states only one of which needs to be suppressed. This is effected by following the three-state stage by the binary stage, and connecting the binary back to the three-state stage so that when the binary is in one state the three-state stage can go through all three states and when the binary is in the other state one of the states of the three-state stage is suppressed.

Figure 1:
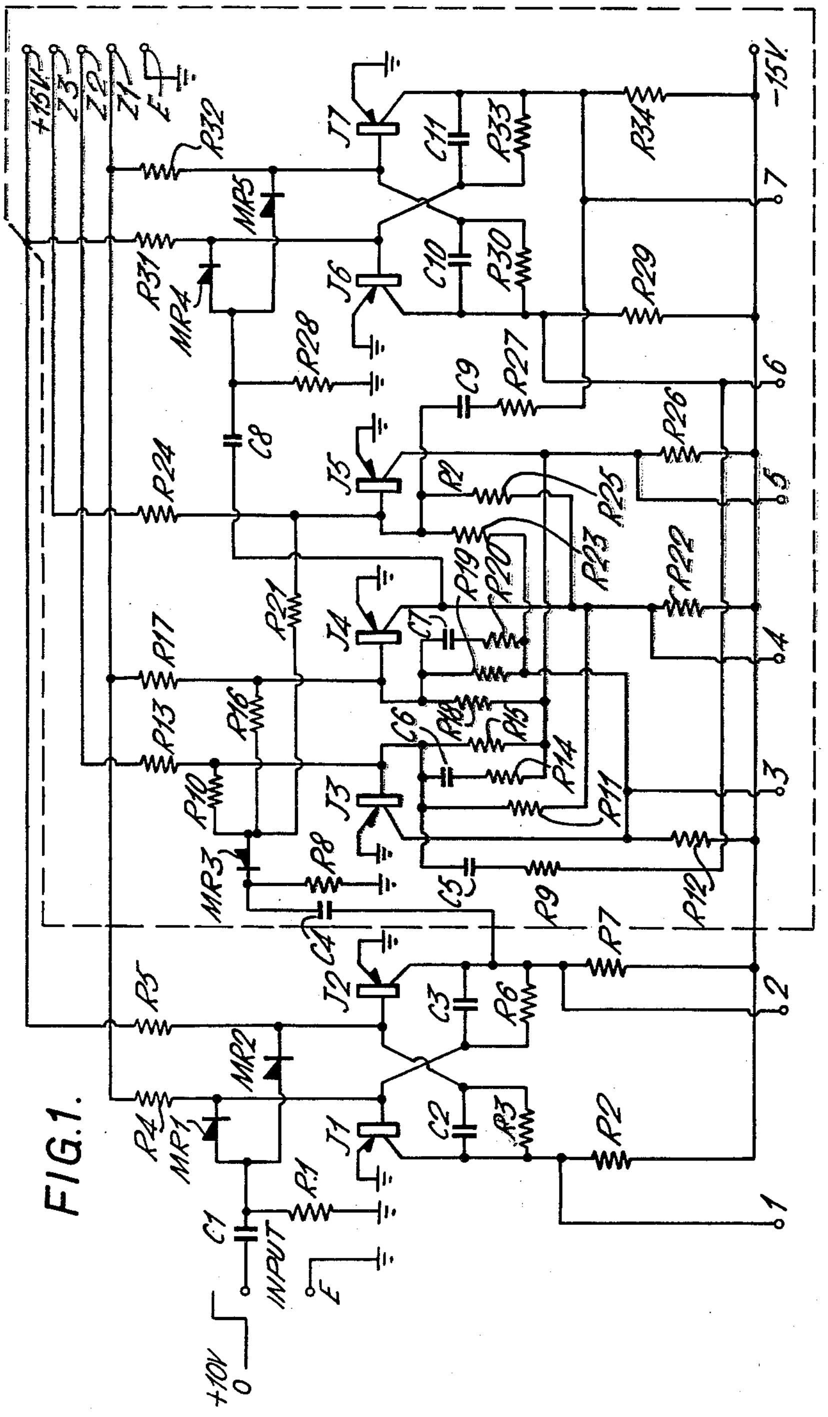
FIG. 1 is a circuit diagram of a scale-of-ten circuit embodying the invention.

Referring to FIG. 1, transistors J3, J4 and J5 are connected in a three-state stage, which is combined with a binary stage comprising transistors J6 and J7 to form a scale-of-five circuit shown within the broken rectangle. Transistors J1 and J2 form a preceding binary stage, the output of which is fed to the scale-of-five circuit to provide a scale-of-ten.

All the transitsors are operated in the earthed-emitter configuration. The binary stage J1, J2 is a conventional Eccles-Jordan circuit. Positive input pulses are applied to both bases via diodes MR1 and MR2. At every second pulse a negative-going edge appears at the collector of J2 and is fed to the bases of J3, J4 and J5 via capacitor C4, diode MR3, and resistors R10, R16 and R21 respectively.

The D.C. interconnections between J3, J4 and J5, which constitute first, second and third transitsors respectively, are as follows. In the operating condition their bases are connected to +15 v. via resistors R13, R17 and R24 respecitvely. (For resetting purposes these connections may be temporarily changed as explained later.) Their collectors are connected to −15 v. via resistors R12, R22 and R26 respectively. J3 collector is coupled to J4 and J5 bases via resistors R19 and R23 respectively, J4 is coupled to J3 and J5 bases via resistors R11 and R25 respectievly, and J5 is coupled to J3 and J4 bases via resistors R15 and R18 respectively. Assume one transistor, say J5, to be off (i.e. non-conducting apart from $I_{co}$), and the other two transistors J3, J4, to be on (i.e. conducting) and allowed to bottom, so that their collectors are within a few millivolts of earth. Then virtually no current will flow from these colletcors via R23 and R25 to the base of J5. Of the current fed thereto via R24, part supplies the $I_{co}$ for J5, and the remainder flows through R21 in series with R10 and R16 in parallel to the bases of J3 and J4. The voltage developed across these resistors provides a positive bias for the base of J5 relative to the bases of J3 and J4 which maintains J5 off. J3 and J4 are held on by the currents flowing to their bases via R15 and R18 respectively, since the collector of the off transistor J5 is at a low negative potential.

The A.C. sequencing connections of the three-state stage comprise capacitor C6 in series with resistor R14 connected between J5 collector and J3 base, and capacitor C7 in series with resistor R20 connected between J3 collector and J4 base. There is no A.C. connection between J4 collector and J5 base; instead an A.C. output is taken via capacitor C8 and diodes MR4, MR5 to the bases of J6, J7 connected as a binary Eccles-Jordan stage similar to J1, J2. From J6 collector an A.C. output is taken via capacitor C5 and resistor R9 to J3 base, and from J7 collector an A.C. output is taken via capacitor C9 and resistor R27 to J5 base.

The operation of the scale-of-five circuit is as follows. Assume J5 to be off and J3 and J4 on. When a negative pulse is received from J2, tending to turn all three transistors on, this pulse is inverted and amplified by J5 and fed back to J3 base via C6, causing J3 to turn off despite the negative turning on pulse applied to its base. Similarly, on the second pulse J3 turns on and J4 is turned off via C7. When the third pulse turns J4 on, the binary stage J6, J7 is switched via C8. If the binary stage switches in the direction in which J6 turns on and J7 turns off, J3 is then turned off via C5. On the fourth pulse J3 again turns on and turns J4 off. On the fifth pulse J4 turns on and again switches the binary stage J6, J7. This time J7 turns off J5 via C9, thus completing the cycle. It will be seen that the binary stage J6, J7 automatically switches the pulse from J4 collector alternately to either J3 or J5 base.

The resistors R9, R14, R20 and R27 are connected in series with their respective coupling capacitors C5, C6, C7 and C9 to make the time-constants of the sequencing turn-off pulses approximately equal to the time-constant of the turn-on pulses from J2. Otherwise the tail of the negative turn-on pulse might appear at the base of a transistor being turned off, and might be large enough to bring it on again. Another advantage of including these resistors is that when a transitsor is turned off the initial fall of its collector potential is not delayed by the coupling capacitors. This rapid initial fall causes current to flow immediately in the D.C. coupling resistors and helps to hold on the transistor being turned on, thus opposing any tendency for the tail of a turn-off pulse to reach the base of the latter transistor and turn it off again.

Figure 2:
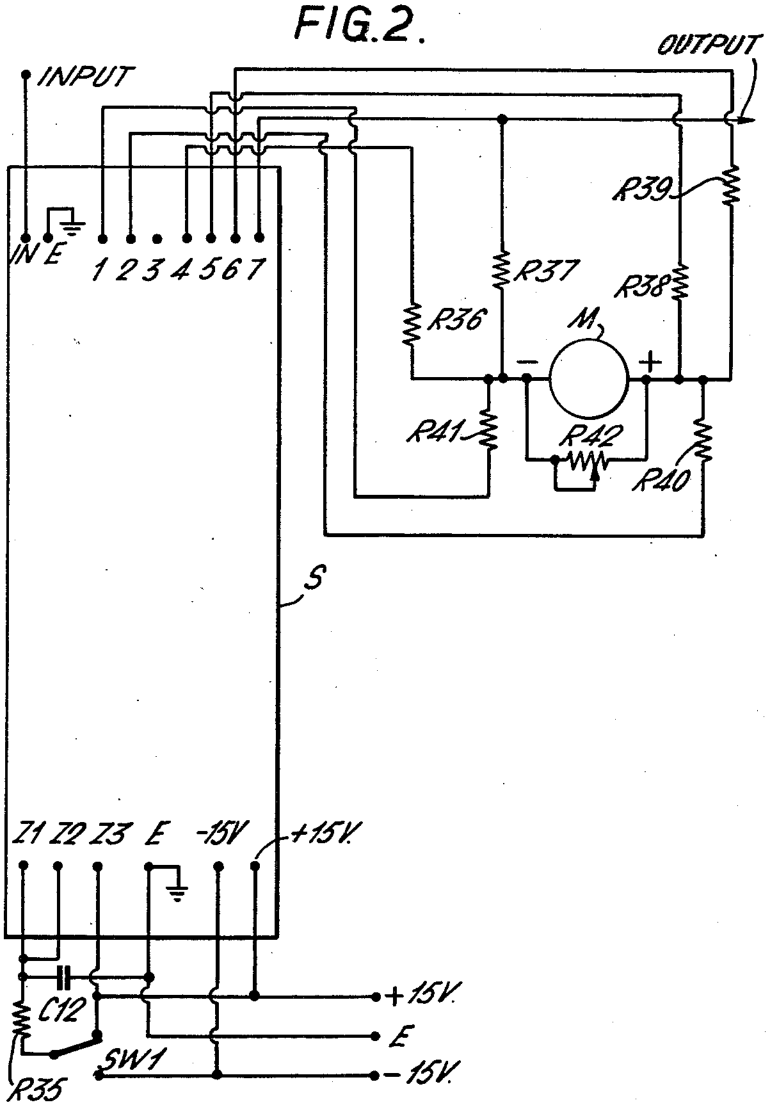
FIG. 2 is a circuit diagram of a reset and meter display arrangement.
Figure 2A:
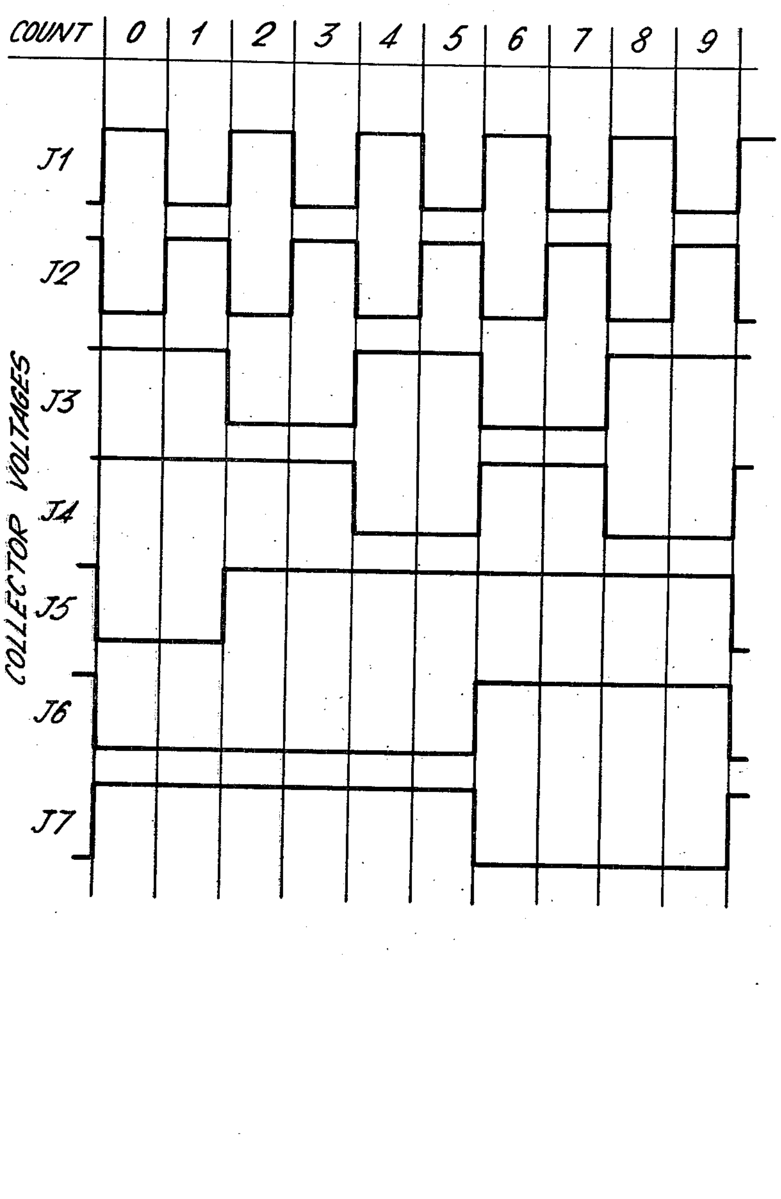

In FIG. 2 the scale-of-ten circuit is represented by the block S. The terminals 1–7 are connected to the successive collectors of J1–J7 as shown in FIG. 1 and the remaining terminals INPUT, E, Z1, Z2, Z3, etc. also correspond to those shown in FIG. 1. The resetting circuit comprises a switch SW1 through which the terminals Z1, Z2, and hence the bases of J1, J3, J4 and J7, are normally connected to +15 v. via R35. If the switch is operated to connect R35 to —15 v., J1, J3, J4 and J7 are turned on. The switch is then returned to +15 v., leaving the circuit in the state assumed in the foregoing description. C12 is provided in conjunction with R35 to suppress switching transients.

The connections shown from the terminals 1, 2, and 4–7 to the centre-zero meter M via resistors R36–41 and shunt R42 provide a meter indication of the count, the dial being calibrated linearly from 0–9.

FIG. 2(*a*) shows the collector waveforms of transistors J1–J7. It will be seen that positive-going output signals are available at three different points in the cycle, viz. from the collector of J5 on counting "2," from the collector of J6 on counting "6" and from the collector of J7 on counting "10."

Figure 3:
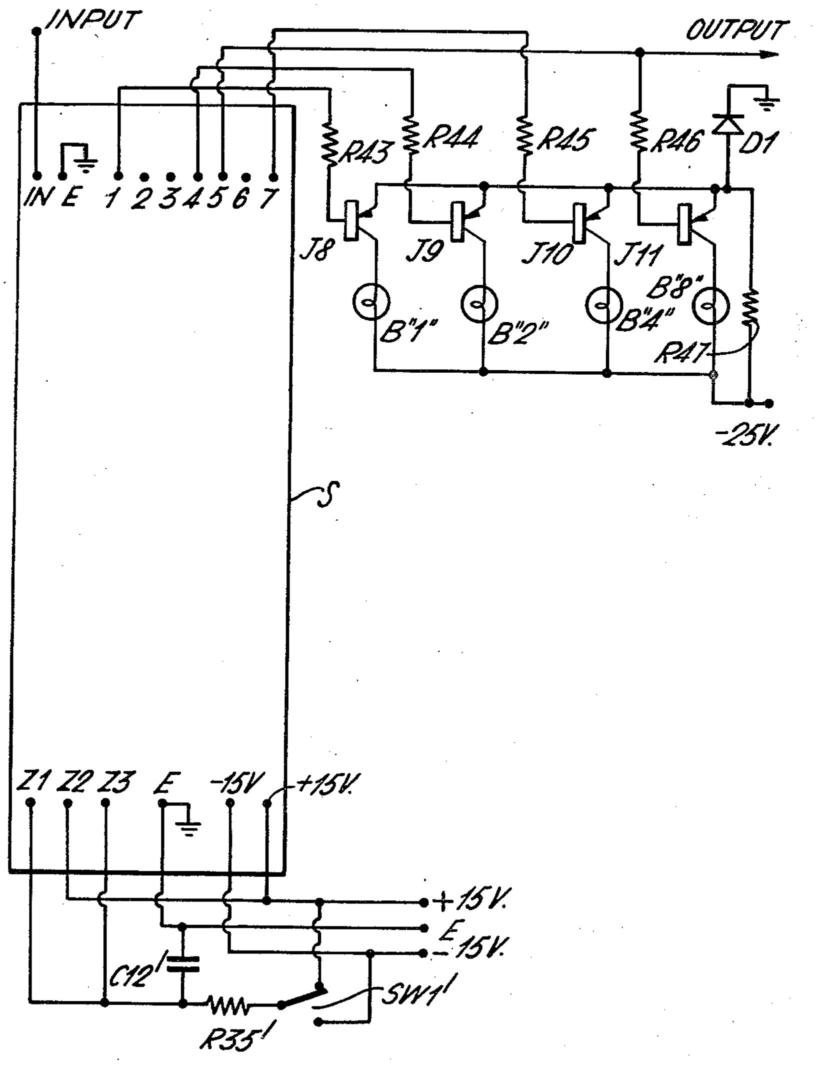
FIG. 3 is a circuit diagram of a modified reset and bulb display arrangement.
Figure 3A:
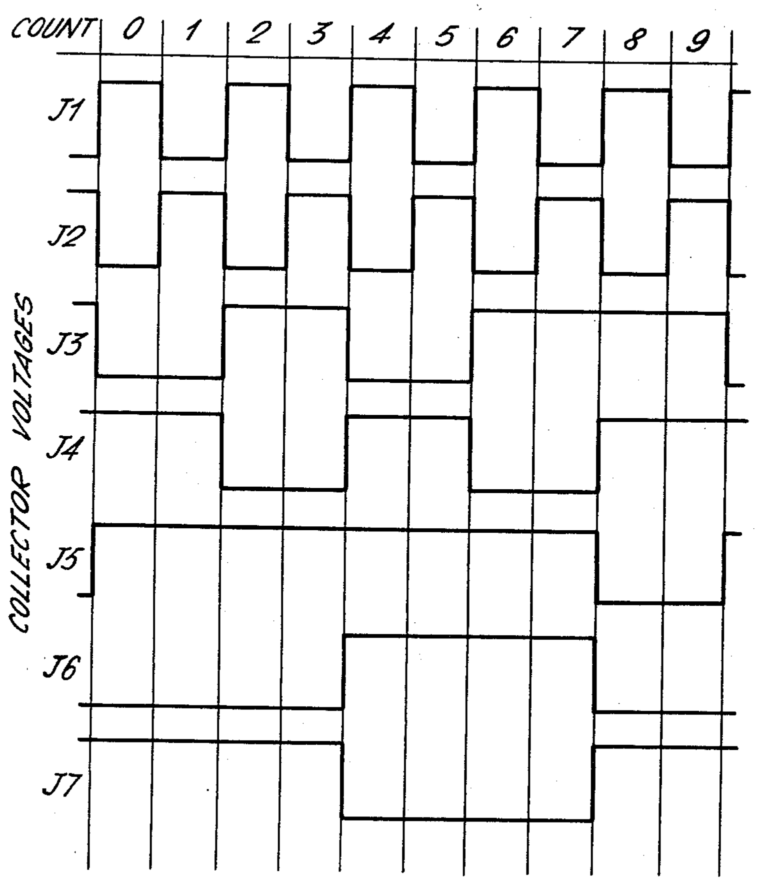

In FIG. 3 the resetting connections are modified in that the scale-of-five circuit terminals Z1 and Z3 are taken negative by the action of SW1. Thus the three-state stage commences counting with J4 and J5 on and J3 off. The corresponding collector waveform sequence is shown in FIG. 3(*a*). It will be seen that with this sequence positive output signals are available from J6 on counting "4," from J7 on counting "8," and from J5 on counting "10." Thus by setting the initial state of the three-state stage appropriately, an output pulse is obtainable after any even number of pulses applied to the scale-of-ten. This simplifies the design of a scaler intended to count up to a predetermined number.

The output pulses to the next decade (from J7 in FIG. 2 and from J5 in FIG. 3) are suitable for driving the decade directly.

In FIG. 3 electric bulbs are used to display the count. Connections are taken from the collectors of J1, J4, J5 and J7 via resistors R43–R46 to the bases of transistors J8–J11 respectively, each having a bulb B in series with its collector marked "1," "2," "4," and "8" respectively. Their emitters are held at —3.3 v. relative to earth by the Zener diode D1 fed by R47. Hence each of the transistors J8–J10 is cut off while its associated scaling transistor is on, but comes into conduction and lights a bulb when its associated scaling transistor turns off, and the collector potential thereof falls below —3.3 v.

With the present scaling circuit no separate gating circuit is required, nor does it involve setting and then immediately resetting any circuits, as with some forms of modified binary scaler. Since there is no A.C. coupling between J4 collector and J5 base there is no danger of the three-stage circuit acting as a phase-shift oscillator, as can happen with some ring scaling circuits.

Component values in the described embodiments are (resistors in kilohms, capacitors in picrofarads or microfarads ($\mu$f.)):

| | |
|---|---|
| R1—4.7 | R31, R32—100 |
| R2—2.7 | R33—22 |
| R3—22 | R34—4.7 |
| R4, R5—100 | R35, R35′—1 |
| R6—22 | R36—43 |
| R7—2.7 | R37—47 |
| R8—4.7 | R38—43 |
| R9, R10—2.2 | R39—47 |
| R11—22 | R40, R41—220 |
| R12—3.9 | R42—Dependent on resistance of M |
| R13—100 | R43–R46—6.8 |
| R14—2.2 | R47—2.2 |
| R15—22 | C1, C2, C3—150 |
| R16—2.2 | C4—220 |
| R17—100 | C5—100 |
| R18, R19—22 | C6, C7, C8—150 |
| R20, R21—2.2 | C9—100 |
| R22—3.9 | C10, C11—150 |
| R23—22 | C12, C12′—0.1 $\mu$f. |
| R24—100 | J1–J7—OC44 |
| R25—22 | J8–J11—GET104 |
| R26—3.9 | MR1–MR5—OA47 |
| R27—2.2 | M—250–0–250 $\mu$a. |
| R28, R29—4.7 | |
| R30—22 | |

I claim:

1. A scale-of-five circuit comprising a three-state stage having three electronic switching devices each having two states of conduction, said devices being direct current interconnected such that in each stable state two of said devices are in one state of conduction and the third is in the other state of conduction, alternating current connections from a first pair of said three devices to a second pair of said three devices respectively for sequencing said other state in response to input pulses applied simultaeneously to said three devices, a binary stage, and an alternating current connection from the one of said devices excluded from said first pair of devices by way of said binary stage to each of the devices of said second pair of devices for sequencing said other state of conduction from said one of the devices alternately to each of the devices of said second pair.

2. A scale-of-five circuit comprising a three-state stage having first, second and third transistors and symmetrical direct current couplings from each transistor to the other two such that in each stable state two transistors are on and one off, a common input pulse connection for turning on all three transistors, alternating current couplings between the first and second and between the third and first transistors for turning off the second or first transistor when the first or third transistor respectively turns on, a binary stage having fourth and fifth transistors symmetrically direct current and alternating current coupled, an alternating current coupling from the second transistor to switch the binary stage each time the second transistor turns on, and alternating current couplings from the fourth and fifth transistors to the first and third transistors respectively to turn off the first or third transistor each time the fourth or fifth transistor respectively turns on.

3. A scale-of-ten circuit formed by a first binary stage having an input connection over which input pulses are arranged to be supplied and an output connection over which an output pulse is supplied by the first binary stage in response to each alternate input pulse, and a scale-of-five circuit comprising an input connection connected to said output connection of the first binary stage, a three-state stage having three electronic switching devices each having two states of conduction, said devices being direct current interconnected such that in each stable state two of said devices are in one state of conduction and the third is in the other state of conduction, alternating current connections from a first pair of said three devices to a second pair of said three devices respectively for sequencing said other state in response to said output pulses supplied by the first binary stage which are applied simultaneously to said three devices, a second binary stage, and an alternating current connection from the one of said devices excluded from said first pair of devices by way of said binary stage to each of the devices of said second pair of devices for sequencing said other state of conduction from said one of the devices alternately to each of the devices of said second pair.

4. A scale-of-ten circuit formed by a first binary stage having an input connection over which input pulses are arranged to be supplied and an output connection over which an output pulse is supplied by the first binary stage in response to each alternate input pulse, and a scale-of-five circuit comprising a three-state stage having first, second and third transistors and symmetrical direct current couplings from each transistor to the other two such that in each stable state two transistors are on and one off, an input connection connected to said output connection of the first binary stage for turning on all three transistors in response to each output pulse supplied by the first binary stage, alternating current couplings between the first and second and between the third and first transistors for turning off the second or first transistor when the first or third transistor respectively turns on, a second binary stage having fourth and fifth transistors symmetrically alternating current and direct current coupled, an alternating current coupling from the second transistor to switch the second binary stage each time the second transistor turns on, and alternating current couplings from the fourth and fifth transistors to the first and third transistors respectively to turn off the first or third transistor each time the fourth or fifth transistor respectively turns on.

References Cited by the Examiner

UNITED STATES PATENTS

| | | | |
|---|---|---|---|
| 2,777,067 | 1/57 | Higby | 328—205 XR |
| 2,858,432 | 1/58 | Dickinson | 328—205 XR |
| 3,070,713 | 12/62 | Leightner | 307—88.5 |

ARTHUR GAUSS, *Primary Examiner.*